United States Patent

Uzaki et al.

[11] Patent Number: 5,825,999
[45] Date of Patent: Oct. 20, 1998

[54] MINIMUM CHARACTER REGION DETERMINING APPARATUS AND METHOD, CHARACTER STRING GENERATING APPARATUS FOR GENERATING A CHARACTER STRING ACCORDING TO THE MINIMUM CHARACTER REGION DETERMINING METHOD

[75] Inventors: Jiro Uzaki, Yokosuka; Masanori Kono, Yokohama, both of Japan

[73] Assignee: Victor Company of Japan, Ltd., Yokohama, Japan

[21] Appl. No.: 362,348

[22] Filed: Dec. 22, 1994

[30] Foreign Application Priority Data

Dec. 28, 1993 [JP] Japan .................................. 5-353227

[51] Int. Cl.$^6$ ..................................................... G06F 5/00
[52] U.S. Cl. ........................... 395/167; 395/169; 395/172
[58] Field of Search ..................................... 395/150, 151, 395/111, 117, 805, 167, 168, 169, 170, 171, 172; 382/301; 345/124, 141; 400/9

[56] References Cited

U.S. PATENT DOCUMENTS

| 5,399,029 | 3/1995 | Muraoka et al. ............................ 400/9 |
| 5,432,890 | 7/1995 | Watanabe ................................ 395/100 |
| 5,501,538 | 3/1996 | Sawada et al. ........................... 400/304 |
| 5,566,276 | 10/1996 | Muraishi ................................ 395/110 |

FOREIGN PATENT DOCUMENTS 4-361077 12/1992 Japan .

*Primary Examiner*—Heather R. Herndon
*Assistant Examiner*—Stephen Hong
*Attorney, Agent, or Firm*—Lowe, Price, LeBlanc & Becker

[57] ABSTRACT

A squared character region for a letter is partitioned into three partitive regions arranged in a longitudinal direction to partition the letter. Thereafter, a right fit position of a portion of the letter placed at the most right side in a partitive region is determined for each of the partitive regions. Therefore, the right fit positions indicate right shape features of the letter. Thereafter, a right minimum fit position indicating the most right position among the right fit positions is determined, a right proportional position is regarded as a right kerning position in a partitive region relating to the right minimum fit position, and another right kerning position is set between the right minimum fit position and the right fit position for each of remaining partitive regions. Also, a left kerning position is determined in the same manner for each of the partitive regions. A minimum character region for the letter is defined as an enclosed region specified by the right and left kerning positions, and letters of a character string are put close together by connecting minimum character regions determined for the letters in series on condition that the minimum character regions are not overlapped each other.

13 Claims, 11 Drawing Sheets

FIG. 4A
PRIOR ART
TwA
FIG. 4B
PRIOR ART
TwA
FIG. 5
PRIOR ART
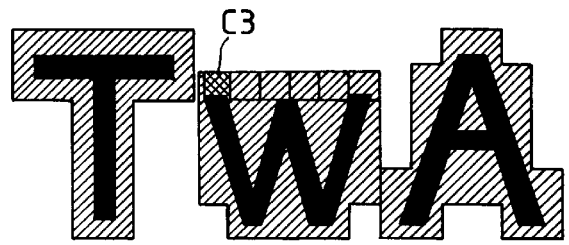
FIG. 6
PRIOR ART
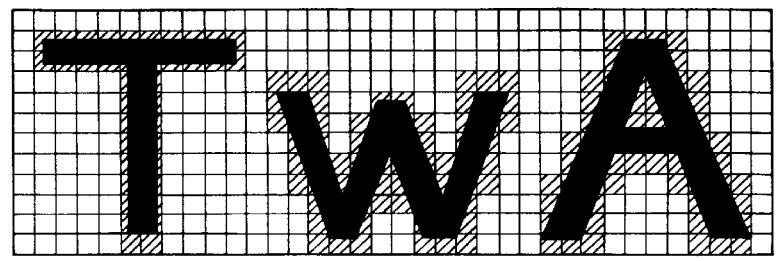

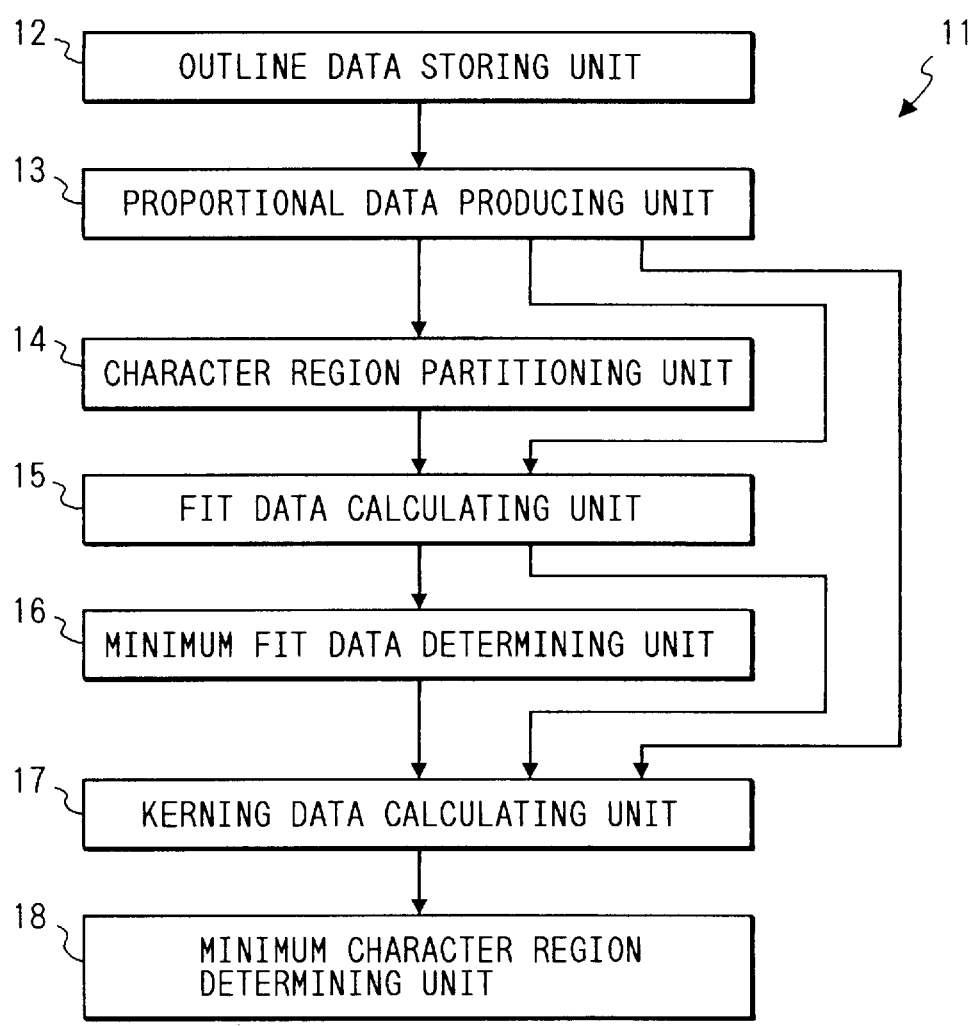

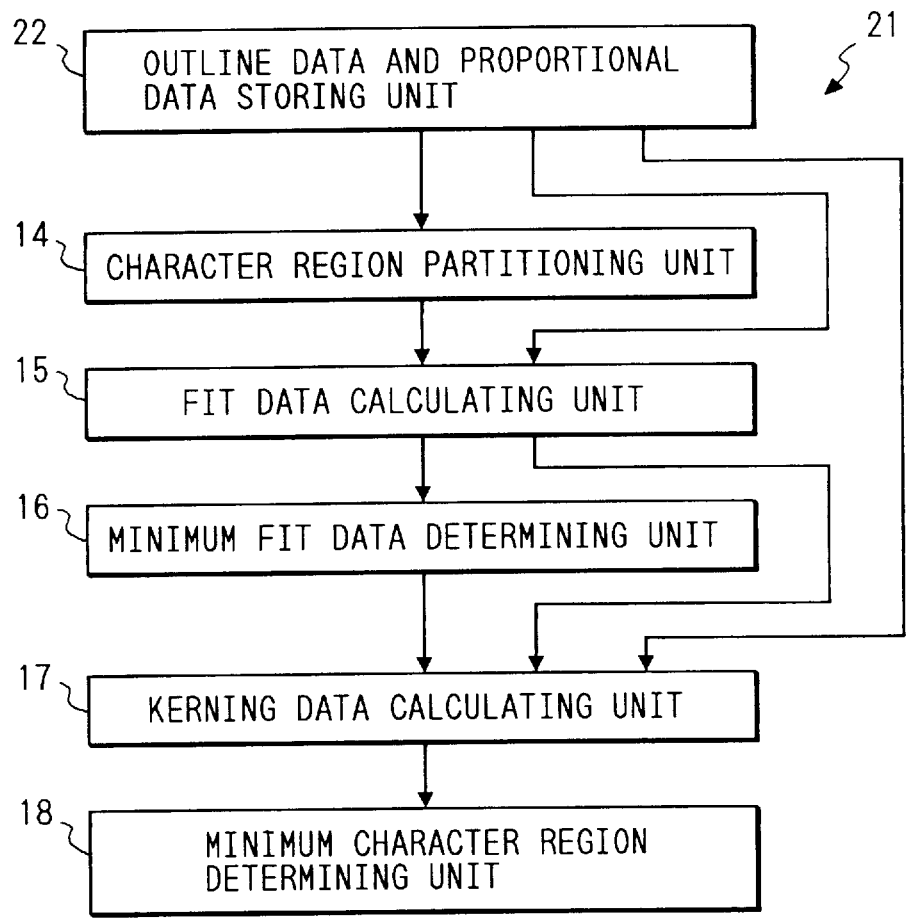
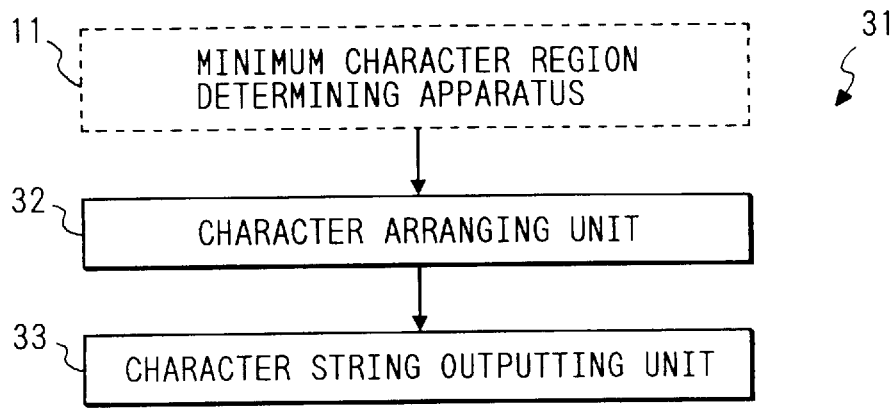

MINIMUM CHARACTER REGION DETERMINING APPARATUS AND METHOD, CHARACTER STRING GENERATING APPARATUS FOR GENERATING A CHARACTER STRING ACCORDING TO THE MINIMUM CHARACTER REGION DETERMINING METHOD

BACKGROUND OF THE INVENTION

1. Field of the Invention

The present invention relates to minimum character region determining apparatus and method, which is utilized in a printing apparatus for printing a character string on a printing medium and in a displaying apparatus for displaying a character string on a displaying unit, in which a minimum character region required for a character is automatically determined. Also, the present invention relates to a character string generating apparatus in which letters of a character string are put close together to arrange the letters at appropriate character pitches on condition that the minimum character regions for the letters determined by the minimum character region determining apparatus according to the minimum character region determining method for the purpose of printing out the character string on the printing medium or displaying the character string on the displaying unit.

2. Description of the Prior Art

There are many types of character pitch setting technique such as traditional-, kerning-, touching- and overlapping-techniques,. In cases where characters in a character string are arranged in equal intervals according to the traditional character pitch setting technique, characters adjacent to each other appear to be distantly or closely arranged, in dependence on types of the characters. In particular, whether letters of the English alphabet adjacent to each other appear to be distantly or closely arranged considerably depends on types of the letters. Therefore, it is required to determine a character pitch (or a kerning value) for each pair of characters adjacent to each other while considering types of the characters according to the kerning character pitch setting technique. In the kerning technique, a character pitch is set to a kerning value less than a character size, and a character intrudes into a squared character region of an adjacent character on condition that the character does not touch the adjacent character.

In a first conventional technique, a fixed value is adopted as a character pitch between arbitrary characters adjacent to each other. However, because characters in a character string are equally spaced at a fixed pitch, pitches of the characters appear to differ from each other, so that there is a drawback that a reader feels uncomfortable.

In a second conventional technique, to change a character pitch between a fore character and a rear character adjacent to each other, a proportional pitch predetermined for a type of the fore character is adopted as the character pitch. However, because a proportional pitch is predetermined for each of the character types, the character pitch for a front character is uniformly determined to a corresponding proportional pitch regardless of a type of a rear character. Therefore, character pitches in a character string appear to differ from each other, so that there is the same drawback that a reader still feels uncomfortable.

In a third conventional technique, to determine a character pitch between characters adjacent to each other for each of types of the characters, a character pitch is predetermined for each of the combinations of character types. In this case, a high-grade computer is utilized to read a character pitch stored in a memory for each pair of characters utilized in a character string. However, because it is required to store a large number of character pitches corresponding to a large number of combinations of character types, a large capacity type memory is required of a computer. Therefore, character pitches defined among alphanumeric characters are limitedly stored in the large capacity type memory. Also, even though character pitches in alphanumeric characters are utilized, there is a drawback that a high-grade type computer is required.

2.1. Previously Proposed Art

To solve the above drawbacks, a letter distance data generating apparatus has been disclosed in a Published Unexamined Japanese Patent Application No. 361077 of 1992 (H4-361077). In this application, features of a letter outline are stored for each of the letters, and a letter distance is generated according to the features of the letter for each of the letters. Therefore, a storage capacity of the letter distance data is considerably reduced even though a letter distance between letters adjacent to each other is changed for each of types of the letters. In detail, a region of a letter is divided into a plurality of squared cells in a checker pattern, and particular squared cells in which portions of the letter exist are specified. Thereafter, a group of particular squared cells for a rear letter is connected to another group of particular squared cells defined for another region of a fore letter adjacent to the rear letter on condition that the groups do not overlap each other, so that a letter distance between the fore and rear letters is determined for each of the combinations of the fore and rear letters.

2.2. Problems to be Solved by the Invention

However, because the letter distance is determined in a squared cell unit, a shortest distance between a portion of the fore letter and a portion of the rear letter is in a wide range from almost a zero to a length equal to a double cell width, so that there is a drawback that the letter distance considerably varies.

For example, the following describes an application of the letter distance data generating apparatus to a letter string "TwA" according to the kerning technique, with reference to FIGS. 1 to 8.

As shown in FIG. 1, a first region R1 of a first group of particular squared cells for a letter "T", a second region R2 of a second group of particular squared cells for a letter "w" and a third region R3 of a third group of particular squared cells for a letter "A" are formed. In this case, because the letter "w" occupies only a small portion of a particular squared cell C1 (hereinafter, "slightly occupies cell C1") and the letter "A" slightly occupies a particular squared cell C2 connected to the cell C1, a shortest distance between the letter "w" and the letter "A" is almost equal to a double cell width, as shown in FIG. 2A. However, in cases where the letter "w" occupies a great part of the particular squared cell C1 because of a positional relationship between the letter "w" and the letter "T" and the second group of particular squared cells for the letter "w" from the first, the shortest distance between the differently placed letter "w" and the letter "A" is almost as short as a single cell width, as shown in FIG. 2B. Therefore, in cases where the letters "T", "w" and "A" of the letter string "TwA" are put close together in the letter distance data generating apparatus, the arrangement of the letters "T", "w" and "A" shown in FIG. 3A is obtained in case of the positional relationship shown in FIG. 2A, and the arrangement of the letters "T","w" and "A" shown in FIG. 3B is obtained in case of the positional relationship shown in FIG. 2B. As a result, the letter string "TwA" shown in FIG. 4A is printed or displayed in case of the arrangement shown in FIG. 3A, and the letter string "TwA" shown in FIG. 4B is printed or displayed in case of the arrangement shown in FIG. 3B. In this case, a reader feels a letter distance between the letters "w" and "A" shown in FIG. 4A to be too long.

Also, as shown in FIG. 5, in cases where an upper left portion of the letter "w" slightly occupies a particular squared cell C3, a left portion of the letter "w" is not placed under an upper right portion of the letter "T". Therefore, a letter distance between the letters "T" and "w" becomes too long.

Accordingly, there is a drawback in that a letter distance determined in the letter distance data generating apparatus varies in dependence on a positional relationship between a letter and a group of squared cells, and letter distances in a letter string are not uniformly set.

Also, as shown in FIG. 6, in cases where the squared cells are downsized to reduce the variation of a letter distance depending on the positional relationship, the letters "T","w" and "A" of the letter string "TwA" are put close together in the letter distance data generating apparatus as shown in FIG. 7. Therefore, the letter string "TwA" is printed or displayed. In this case, because a left portion of the letter "w" is excessively placed under an upper right portion of the letter "T", a reader feels uncomfortable to read the letter string "TwA".

Accordingly, there is a drawback in that that letter distances in a letter string vary in dependence on the size of the squared cells, and it is difficult to determine an appropriate size of squared cells for all alphanumeric characters.

Also, because the number of squared cells required for a letter is increased in cases where the squared cells are downsized, a calculation volume required to put letters of a letter string close together is extremely increased, so that there is another drawback in that that a processing speed for determining letter distances of the letters is delayed.

In addition, in cases where a Japanese letter string "しつ" of Japanese letters "し" and "つ" is printed or displayed, the Japanese letter string shown in FIG. 9A is the best shape. However, in cases where the letter distance data generating apparatus is applied for determining a letter distance between the Japanese letters, the letters are put too close together when a size of squared cells is small, as shown in FIG. 9B. Also, even though large sized square cells are utilized in the letter distance data generating apparatus to hopefully form the Japanese letter string shown in FIG. 10A, the letters are still put too close together, and the Japanese letter string shown in FIG. 10B is undesirably printed or displayed.

Accordingly, there is a drawback in that the letter distance data generating apparatus (No. 361077 of 1992) cannot be applied for Japanese letters or a Japanese letter string.

SUMMARY OF THE INVENTION

A first object of the present invention is to provide, with due consideration to the drawbacks of such a conventional letter distance data generating apparatus, a character region determining apparatus and method in which a minimum character region required for a letter of an alphanumeric character string or a Japanese letter string is easily determined by use of a small capacity sized memory.

A second object of the present invention is to provide a character string generating apparatus in which letters of a character string are put close together to arrange the letters at appropriate character pitches on condition that the minimum character regions for the letters determined in the minimum character region determining apparatus according to the minimum character region determining method are not overlapped.

To achieve the first object, in the present invention, outline data of a letter placed in a rectangular character region is prepared. Thereafter, right proportional data indicating a right proportional position spaced apart from the letter toward a right direction is produced in proportional data producing means according to the outline data of the letter. Also, the rectangular character region of the letter is horizontally partitioned into a plurality of partitive regions in character region partitioning means, so that the letter is horizontally partitioned into a plurality of portions. Thereafter a right fit position, at which a portion of the letter placed at the most right side in one partitive region is positioned, is specified for each of the partitive regions according to the outline data of the letter, and right fit data indicating one right fit position is produced for each of the partitive regions in a fit data producing means. Thereafter, in a minimum fit data determining means is determined right minimum fit data, denoting one right fit position placed on the most right side among the right fit positions of the right fit data. One partitive region relating to the right minimum fit data is called a right minimum partitive region. Also, the right proportional data is set to right kerning data for the right minimum partitive region in a first kerning data setting means. Thereafter, in a second kerning data setting means, a prescribed right value between a value of the right minimum fit data and a value of one right fit data for one partitive region is set to a value of another right kerning data for each of the partitive regions other than the right minimum partitive region.

Therefore, the right kerning data for all partitive regions are determined. Also, in the same manner, left kerning data for all partitive regions are determined from left minimum fit data for a left minimum partitive region and left fit data. Thereafter, for a letter having a right side which is limited by a plurality of right kerning positions indicated by the right kerning data and a left side which is limited by a plurality of left kerning positions indicated by the left kerning data, a minimum character region is determined by a minimum character region determining means, and the minimum character region is displayed.

Accordingly, because it is not required to store the kerning data for all types of letters in advance in a memory, and because the kerning data for each letter are automatically calculated, a memory having a large capacity is not required in order to determine the minimum character region for each letter.

Also, because the minimum character region for each letter is specified by the kerning data, the letters of the word can be put close together on condition that the letters do not overlap each other.

To achieve the second object in the present invention, the letters are arranged in a line in the character arranging means, to put the letters close together on condition that the minimum character regions determined for the letters in the minimum character region determining means are not overlapped with each other, and a character string composed of the letters is obtained. The character string is output by character string outputting means.

Accordingly, when a plurality of letters, for which a plurality of minimum character regions are determined, are arranged in series to form a word, because a space between each pair of adjacent letters can be arbitrarily adjusted by adjusting the proportional data, the prescribed right value between the right minimum fit data and one right fit data for each partitive region, and the prescribed left value between the left minimum fit data and one left fit data for each partitive region, a person can feel that letter spaces in the word are uniformly set, and the letter spaces in the word can be rapidly determined.

BRIEF DESCRIPTION OF THE DRAWINGS

The objects, features and advantages of the present invention will be apparent from the following description taken in conjunction with the accompanying drawings, in which:

FIG. 4A shows a letter string "TwA" of the letters "T", "w" and "A" shown in FIG. 3A;

FIG. 4B shows a letter string "TwA" of the letters "T", "w" and "A" shown in FIG. 3B;

FIG. 5 shows a letter string "TwA" in which an upper left portion of the letter "w" slightly occupies a particular squared cell C3;

FIG. 6 shows a letter string "TwA" placed in downsized square cells;

FIG. 11 is a block diagram of a character pitch determining apparatus according to an embodiment of the present invention;

FIG. 18 is a block diagram of a character pitch determining apparatus according to another embodiment of the present invention;

FIG. 19 is a block diagram of a character string generating apparatus according to an embodiment of the present invention;

DESCRIPTION OF THE PREFERRED EMBODIMENTS

Figure 1:
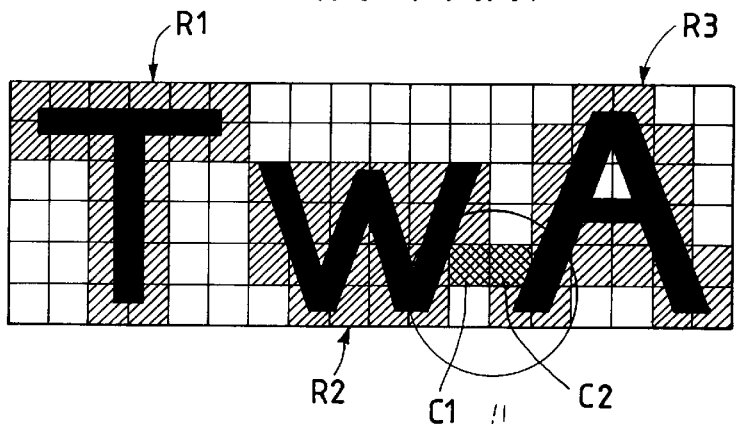
FIG. 1 shows a letter string "TwA" arranged in a plurality of squared cells.
Figure 2A:
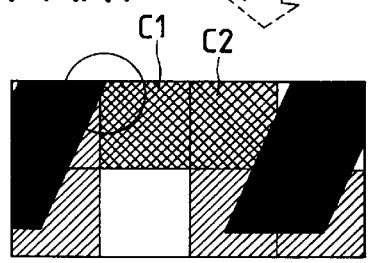
FIG. 2A shows a shortest letter distance between letters "w" and "A" shown in FIG. 1.
Figure 2B:
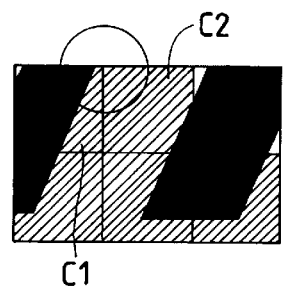
FIG. 2B shows another shortest letter distance between letters "w" and "A" arranged according to another case.
Figure 3A:
FIG. 3A shows the arrangement of the letters "T", "w" and "A" shown in FIG. 2A according to letter distances determined in a conventional letter distance data generating apparatus.
Figure 3B:
FIG. 3B shows the arrangement of the letters "T", "w" and "A" shown in FIG. 2B according to letter distances determined in the conventional letter distance data generating apparatus.
Figure 7:
FIG. 7 shows the arrangement of the letter string "TwA" placed in downsized square cells in which the letters "T", "w" and "A" are put close together in the conventional letter distance data generating apparatus.
Figure 8:
FIG. 8 shows the letter string "TwA" shown in FIG. 7 which is printed or displayed.
Figure 9A:
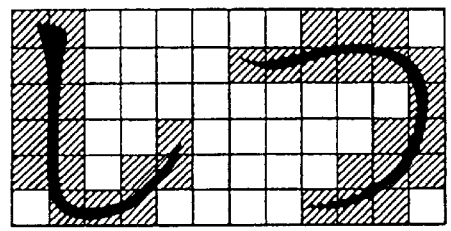
FIG. 9A shows a Japanese letter string in the best arrangement.
Figure 9B:
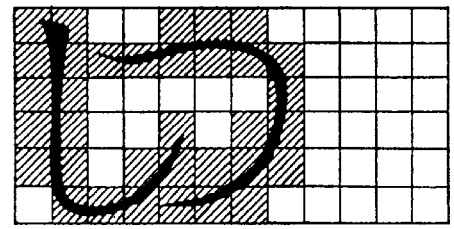
FIG. 9B shows the Japanese letter string, which is placed in small sized square cells, shaped in the conventional letter distance data generating apparatus.
Figure 10A:
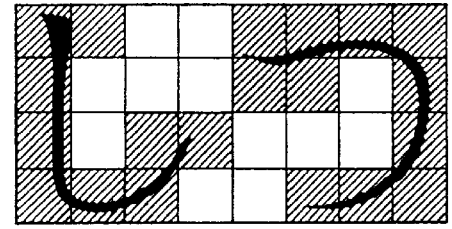
FIG. 10A shows a Japanese letter string with enlarged square cells in the best arrangement.
Figure 10B:
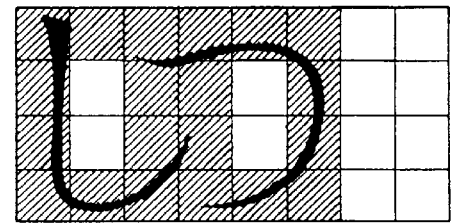
FIG. 10B shows the Japanese letter string, which is placed in enlarged square cells, shaped in the conventional letter distance data generating apparatus.

Preferred embodiments of a character pitch determining apparatus and method according to the present invention are described with reference to drawings.

FIG. 11 is a block diagram of a character pitch determining apparatus according to an embodiment of the present invention.

As shown in FIG. 11, a minimum character region determining apparatus 11 comprises an outline data storing unit 12 formed of a read only memory (ROM) for storing pieces of outline data for each of letters such as alphanumeric characters and Japanese letters, a proportional data producing unit 13 for selecting pieces of outline data for a letter stored in the storing unit 12 and producing a piece of right proportional data and a piece of left proportional data for the letter according to the outline data, a character region partitioning unit 14 for equally partitioning a squared character region of the letter selected in the producing unit 13 into a top partitive region, a middle partitive region and a bottom partitive region arranged in a longitudinal direction (or a Y-axis direction) in that order to partition the outline data for the letter, a fit data calculating unit 15 for calculating six pieces of fit data such as a piece of top-right fit data denoting a lateral (or X-axis) directional position of a portion of the letter placed at the most right side in the top partitive region produced in the partitioning unit 14, a piece of top-left fit data denoting another lateral directional position of a portion of the letter placed at the most left side in the top partitive region, a piece of middle-right fit data denoting a lateral directional position of a portion of the letter placed at the most right side in the middle partitive region produced in the partitioning unit 14, a piece of middle-left fit data denoting another lateral directional position of a portion of the letter placed at the most left side in the middle partitive region, a piece of bottom-right fit data denoting a lateral directional position of a portion of the letter placed at the most right side in the bottom partitive region produced in the partitioning unit 14 and a piece of bottom-left fit data denoting another lateral directional position of a portion of the letter placed at the most left side in the bottom partitive region, a minimum fit data determining unit 16 for determining a piece of fit data placed at the most right side among the top-right fit data, the middle-right fit data and the bottom-right fit data calculated in the calculating unit 15 as a piece of right minimum fit data and determining a piece of fit data placed at the most left side among the top-left fit data, the middle-left fit data and the bottom-left fit data calculated in the calculating unit 15 as a piece of left minimum fit data, a kerning data calculating unit 17 for calculating a top-right kerning data of the top portion of the letter denoting a lateral directional position in the top partitive region by utilizing the right proportional data generated in the producing unit 13 or the combination of the top-right fit data calculated in the calculating unit 15 and the minimum right fit data determined in the determining unit 16, calculating a middle-right kerning data of the middle portion of the letter denoting a lateral directional position in the middle partitive region by utilizing the right proportional data or the combination of the middle-right fit data calculated in the calculating unit 15 and the minimum right fit data, calculating a bottom-right kerning data of the bottom portion of the letter denoting a lateral directional position in the bottom partitive region by utilizing the right proportional data or the combination of the bottom-right fit data calculated in the calculating unit 15 and the minimum right fit data, calculating a top-left kerning data of the top portion of the letter denoting a lateral directional position in the top partitive region by utilizing the left proportional data or the combination of the top-left fit data calculated in the calculating unit 15 and the minimum left fit data determined in the determining unit 16, calculating a middle-left kerning data of the middle portion of the letter denoting a lateral directional position in the middle partitive region by utilizing the left proportional data or the combination of the middle-left fit data calculated in the calculating unit 15 and the minimum left fit data, and calculating a bottom-left kerning data of the bottom portion of the letter denoting a lateral directional position in the bottom partitive region by utilizing the left proportional data or the combination of the bottom-left fit data calculated in the calculating unit 15 and the minimum left fit data, and a minimum character region determining unit 18 for determining a minimum character region for the letter of which a right side is limited by the lateral directional positions denoted by the top-right kerning data, the middle-right kerning data and the bottom-right kerning data and a left side is limited by the lateral directional positions denoted by the top-left kerning data, the middle-left kerning data and the bottom-left kerning data.

In the above configuration, a character pitch determining method is briefly described with reference to FIG. 12.

Figure 12:
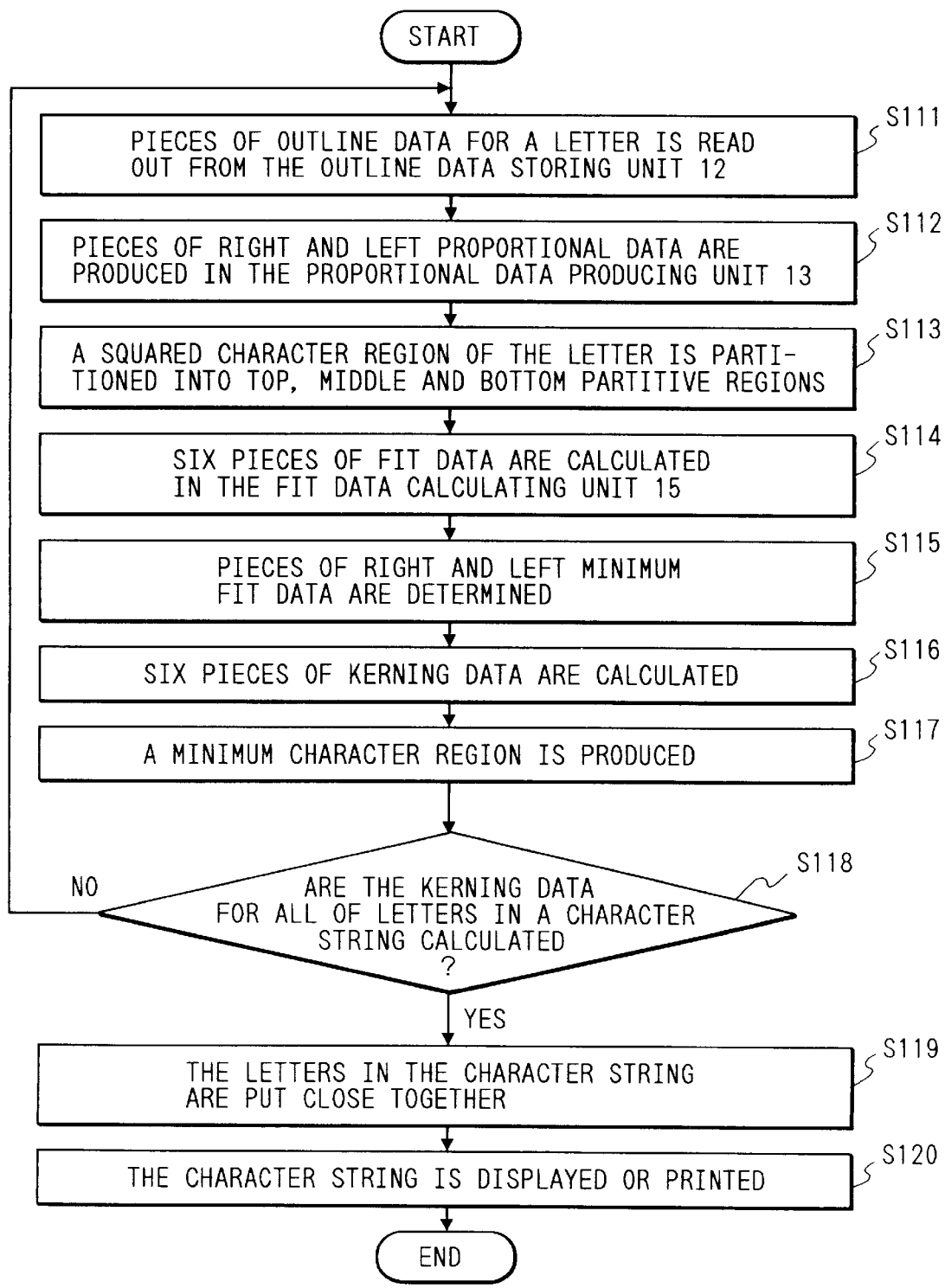
FIG. 12 is a flow chart of a minimum character region determining method performed in the minimum character region determining apparatus shown in FIG. 11.

FIG. 12 is a flow chart of a minimum character region determining method performed in the minimum character region determining apparatus 11 shown in FIG. 11.

As shown in FIG. 12, a letter such as an alphanumeric character or a Japanese letter of a character string is specified, and pieces of outline data for the letter are read out from the outline data storing unit 12 in a step S111. Thereafter, a piece of right proportional data and a piece of left proportional data for the letter are produced from the outline data in the proportional data producing unit 13 in a step S112. Thereafter, a squared character region of the letter is equally partitioned into a top partitive region, a middle partitive region and a bottom partitive region arranged in a longitudinal direction (or a Y-axis direction) in that order in the character region partitioning unit 14 in a step S113. Thereafter, six pieces of fit data such as a piece of top-right fit data, a piece of top-left fit data, a piece of middle-right fit data, a piece of middle-left fit data, a piece of bottom-right fit data and a piece of bottom-left fit data are calculated in the fit data calculating unit 15 in a step S114.

Thereafter, a piece of right minimum fit data and a piece of left minimum fit data are determined in the minimum fit data determining unit 16 in a step S115. That is, a piece of fit data placed at the most right side among the top-right fit data, the middle-right fit data and the bottom-right fit data is selected and is regarded as the right minimum fit data. Also, a piece of fit data placed at the most left side among the top-left fit data, the middle-left fit data and the bottom-left fit data is selected and is regarded as the left minimum fit data.

Thereafter, six pieces of kerning data are calculated in the kerning data calculating unit 17 in a step S116. That is, a top-right kerning data of the top portion of the letter denoting a lateral directional position in the top partitive region is calculated by utilizing the right proportional data or the combination of the top-right fit data and the minimum right fit data, a middle-right kerning data of the middle portion of the letter denoting a lateral directional position in the middle partitive region is calculated by utilizing the right proportional data or the combination of the middle-right fit data and the minimum right fit data, and a bottom-right kerning data of the bottom portion of the letter denoting a lateral directional position in the bottom partitive region is calculated by utilizing the right proportional data or the combination of the bottom-right fit data and the minimum right fit data. Also, a top-left kerning data of the top portion of the letter denoting a lateral directional position in the top partitive region is calculated by utilizing the left proportional data or the combination of the top-left fit data and the minimum left fit data, a middle-left kerning data of the middle portion of the letter denoting a lateral directional position in the middle partitive region is calculated by utilizing the left proportional data or the combination of the middle-left fit data and the minimum left fit data, and a bottom-left kerning data of the bottom portion of the letter denoting a lateral directional position in the bottom partitive region is calculated by utilizing the left proportional data or the combination of the bottom-left fit data and the minimum left fit data.

Thereafter, a minimum character region enclosed by the top-right kerning data, the middle-right kerning data, the bottom-right kerning data, the top-left kerning data, the middle-left kerning data and the bottom-left kerning data is produced in the minimum character region producing unit 18 in a step S117.

Therefore, a minimum character region required for a letter is determined according to the minimum character region determining method shown in FIG. 12 in the minimum character region determining apparatus 11. In cases where letters of a character string are put close together on condition that the minimum character regions for the letters are not overlapped, the letters are arranged to provide a comfortable feeling for a reader.

Thereafter, it is judged in a step S118 whether or not the kerning data for all of letters in the character string are calculated in the steps S111 to S117. In cases where the kerning data for all of the letters in the character string are not calculated, the procedure returns to the step S111 to calculate six pieces of kerning data for another letter in the steps S111 to S117. In contrast, in cases where the kerning data for all of the letters in the character string are calculated, the letters in the character string are put close together on condition that the enclosed regions for the letters are not overlapped in a step S119. Thereafter, the character string is displayed on a display or is printed out on a printing paper in a step S120.

Next, the operation of the minimum character region determining apparatus 11 according to the minimum character region determining method is described in detail.

Figure 13A:
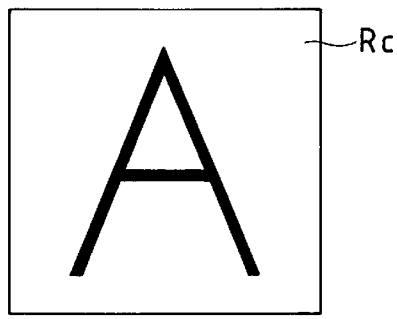
FIGS. 13A to 13F show a procedure of the minimum character region determining method in which a minimum character region for a letter "A" is determined.
Figure 13B:
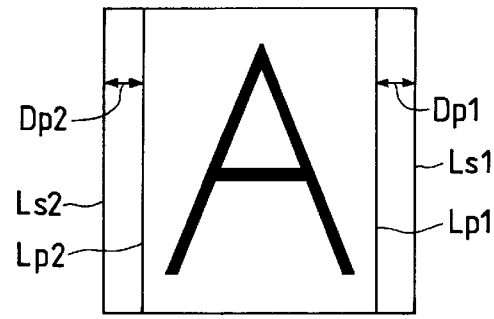
Figure 13C:
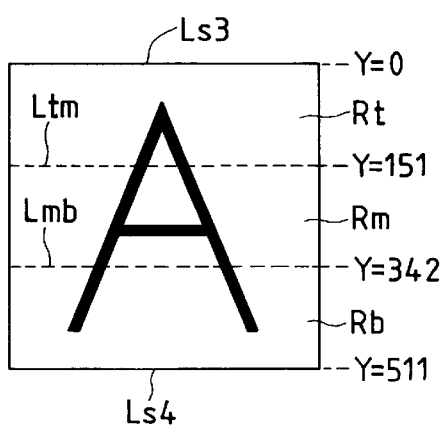

After a letter of a character string is specified, pieces of outline data of the letter are read out from the outline data storing unit 12. As shown in FIG. 13A, the outline data of the letter is defined in a squared character region Rc so as to reproduce the letter "A". That is, an outline of the letter is approximately expressed by a plurality of line segments, and the outline data indicate starting and ending positions of each of the line segments. Thereafter, a piece of right proportional data and a piece of left proportional data of the letter are produced from the outline data in the proportional data producing unit 13. As shown in FIG. 13B, the right proportional data denotes a right proportional distance Dp1 between a right proportional line Lp1 and a right side line Ls1 of the squared character region Rc, and the left proportional data denotes a left proportional distance Dp2 between a left proportional line Lp2 and a left side line Ls2 of the squared character region Rc.

Thereafter, the squared character region Rc of the letter is equally partitioned into a top partitive region Rt, a middle partitive region Rm and a bottom partitive region Rb arranged in a longitudinal direction in that order in the character region partitioning unit 14. In this case, an upper side line Ls3 of the squared character region Rc is defined by a Y coordinate Y=0, a lower side line Ls4 of the squared character region Rc is defined by a Y coordinate Y=511, a top-middle boundary line Ltm between the top partitive region Rt and the middle partitive region Rm is defined by a Y coordinate Y=151, and a middle-bottom boundary line Lmb between the middle partitive region Rm and the bottom partitive region Rb is defined by a Y coordinate Y=342.

Figure 13D:
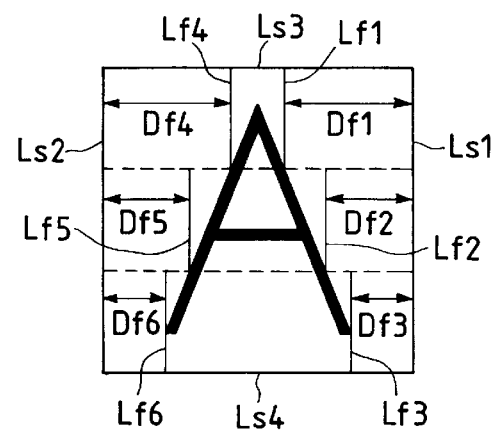

Thereafter, six pieces of fit data such as a piece of top-right fit data, a piece of top-left fit data, a piece of middle-right fit data, a piece of middle-left fit data, a piece of bottom-right fit data and a piece of bottom-left fit data are calculated in the fit data calculating unit 15. In detail, as shown in FIG. 13D, the top-right fit data denotes a lateral directional position of a portion of the letter placed at the most right side in the top partitive region Rt, and the position is defined as a top-right fit distance Df1 between a top-right fit line Lf1 indicating the portion of the letter placed at the most right side and the right side line Ls1. The middle-right fit data denotes a lateral directional position of a portion of the letter placed at the most right side in the middle partitive region Rm, and the position is defined as a middle-right fit distance Df2 between a middle-right fit line Lf2 indicating the portion of the letter placed at the most right side and the right side line Ls1. The bottom-right fit data denotes a lateral directional position of a portion of the letter placed at the most right side in the bottom partitive region Rb, and the position is defined as a bottom-right fit distance Df3 between a bottom-right fit line Lf3 indicating the portion of the letter placed at the most right side and the right side line Ls1. The top-left fit data denotes a lateral directional position of a portion of the letter placed at the most left side in the top partitive region Rt, and the position is defined as a top-left fit distance Df4 between a top-left fit line Lf4 indicating the portion of the letter placed at the most left side and the left side line Ls2. The middle-left fit data denotes a lateral directional position of a portion of the letter placed at the most left side in the middle partitive region Rm, and the position is defined as a middle-left fit distance Df5 between a middle-left fit line Lf5 indicating the portion of the letter placed at the most left side and the left side line Ls2. The bottom-left fit data denotes a lateral directional position of a portion of the letter placed at the most left side in the bottom partitive region Rb, and the position is defined as a bottom-left fit distance Df6 between a bottom-left fit line Lf6 indicating the portion of the letter placed at the most left side and the left side line Ls2.

Therefore, because a position of the letter in the square character region Rc is specified by the right fit lines Lf1,Lf2 and Lf3 and the left fit lines Lf4, Lf5 and Lf6 defined for all of the partitive regions Rt,Rm and Rb, shape features of the letter are specified by the right fit data and the left fit data for each of the partitive regions Rt,Rm and Rb.

In this case, because the outline data indicate the starting and ending positions of each of the line segments, pieces of positional data of the letter at the top-middle boundary line Ltm and the middle-bottom boundary line Lmb are not explicitly provided in cases where the starting or ending position is not placed at the top-middle boundary line Ltm and the middle-bottom boundary line Lmb. Therefore, in cases where a line segment of the letter crosses the top-middle boundary line Ltm or the middle-bottom boundary line Lmb, it is required to judge which is placed closely to the right or left side line Ls1 or Ls2, a position of the line segment at the top-middle (or the middle-bottom) boundary line Ltm (or Lmb) or a starting (or ending) position of a line segment. In this embodiment, a position of the line segment at the top-middle or middle-bottom boundary line Ltm or Lmb is determined according to an intersection point calculating method, and it is judged which represents a lateral directional position of a piece of fit data, the position of the line segment calculated according to the intersection point calculating method or a starting (or ending) position of a line segment placed at the most right (or left) side among all starting and ending positions of line segments in the partitive region Rt, Rm or Rb.

Figure 14:
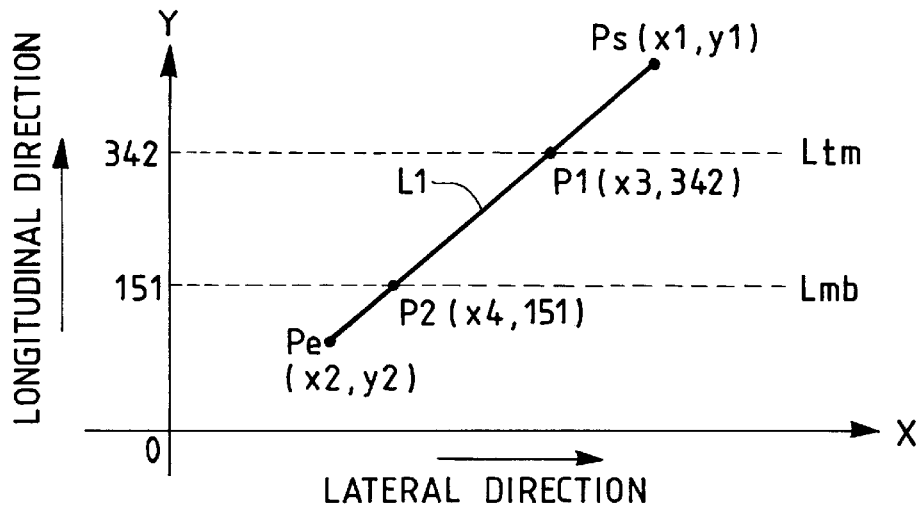
FIG. 14 is a graphic view for explaining an intersection point calculating method applied for a segment line crossing both a top-middle boundary line Ltm and a middle-bottom boundary line Lmb.

The intersection point calculating method applied for a segment line crossing both the top-middle boundary line Ltm and the middle-bottom boundary line Lmb is described in detail as an example with reference to FIG. 14. In cases where starting and ending points Ps and Pe of a segment line L1 are expressed by starting coordinates (x1,y1) and ending coordinates (x2,y2), a line including the segment line L1 is expressed according to an equation (1) in an X-Y coordinate system.

$$Y=(y1-y2)/(x1-x2)*X+C1 \qquad (1)$$

A constant C1 is obtained by substituting (x1,y1) into (X,Y) according to an equation (2).

$$C1=(x1*y2-x2*y1)/(x1-x2) \qquad (2)$$

Therefore, the equation (1) can be rewritten to an equation (3) by substituting the equation (2) into the equation (1).

$$Y32 \{(y1-y2)*X+(x1*y2-x2*y1)\}/(x1-x2) \qquad (3)$$

Because a Y coordinate of a first intersection P1 between the line segment L1 and the top-middle boundary line Ltm is Y=342, an X coordinate x3 of the first intersection P1 is obtained according to an equation (4).

$$x3=\{342*(x1-x2)-(x1*y2-x2*y1)\}/(y1-y2) \qquad (4)$$

Also, a Y coordinate of a second intersection P2 between the line segment L1 and the middle-bottom boundary line Lmb is Y=151, an X coordinate x4 of the second intersection P2 is obtained according to an equation (5).

$$x3 =\{151*(x1=x2)-(x1*y2-x2*y1)\}/(y1-y2) \qquad (5)$$

In cases where a segment line crosses only the top-middle boundary line Ltm, an X coordinate of an intersection point can be obtained according to the equation (4). Also, in cases where a segment line crosses only the middle-bottom boundary line Lmb, an X coordinate of an intersection point can be obtained according to the equation (5).

Assuming that a minimum character region required by a letter is an enclosed region specified by the six fit data, there is a probability that a character pitch between letters becomes zero when letters of a character string put close together. For example, in cases where a fore letter "H" and a rear letter "E" is adjacent to each other in that order, the letters "H" and "E" are attached each other without any character pitch. Therefore, a minimum character region required by a letter is produced to be wider that that specified by the six fit data.

That is, a piece of fit data placed at the most right side among the top-right fit data, the middle-right fit data and the bottom-right fit data is selected and is treated as a piece of right minimum fit data in the minimum fit data determining unit 16. Also, a piece of fit data placed at the most left side among the top-left fit data, the middle-left fit data and the bottom-left fit data is selected and is treated as a piece of left minimum fit data in the minimum fit data determining unit 16. As shown in FIG. 13D, in cases where the letter "A" is specified to determine a minimum character region of the letter "A", the bottom-right fit data is regarded as the right minimum fit data, and the bottom-left fit data is regarded as the left minimum fit data.

Figure 13E:
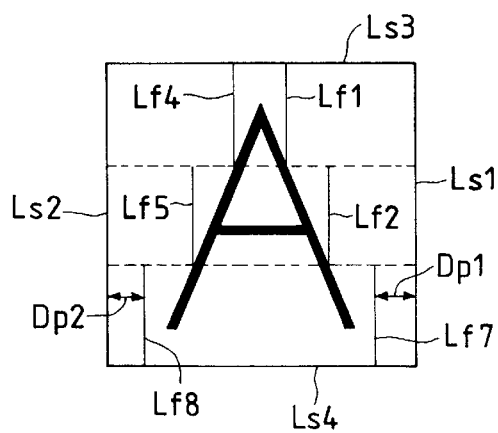

Thereafter, six pieces of kerning data such as a piece of top-right kerning data, a piece of middle-right kerning data, a piece of bottom-right kerning data, a piece of top-left kerning data, a piece of middle-left kerning data and a piece of bottom-left kerning data are calculated in the kerning data calculating unit 17. In detail, the right proportional data is set as a piece of right kerning data denoting a lateral directional position in a partitive region Rt,Rm or Rb in which the right minimum fit data is defined, and the left proportional data is set as a piece of left kerning data denoting a lateral directional position in a partitive region Rt,Rm or Rb in which the left minimum fit data is defined. As shown in FIG. 13E, in cases where the letter "A" is specified to determine a minimum character region of the letter "A", the right proportional data is set as a piece of bottom-right kerning data because the bottom-right fit data is regarded as the right minimum fit data, and the left proportional data is set as a piece of bottom-left kerning data because the bottom-left fit data is regarded as the left minimum fit data. The bottom-right kerning data denotes the right proportional distance Dp1 between a right minimum fit line Lf7 and the right side line Ls1, and the bottom-left kerning data denotes the left proportional distance Dp2 between a left minimum fit line Lf8 and the left side line Ls2.

Each of other pieces of right kerning data is calculated to set a lateral directional position designated by each of the other right kerning data to a middle position between a right fit line Lf1,Lf2 or Lf3 of a piece of corresponding fit data and a lateral directional position denoted by the minimum right fit data. That is, in cases where the bottom-right fit data is regarded as the right minimum fit data, a top-right kerning distance Dk1 between the the right side line Ls1 and a top-right kerning line Lk1 designated by the top-right kerning data is determined as the top-right kerning data according to an equation (6), and a middle-right kerning distance Dk2 between the right side line Ls1 and a middle-right kerning line Lk2 designated by the middle-right kerning data is determined as the middle-right kerning data according to an equation (7).

$$\begin{aligned} Dk1 &= DF1 - (Df1 - Df3)*0.5 \\ &= (Df1 + Df3)*0.5 \end{aligned} \qquad (6)$$

$$\begin{aligned} Dk2 &= Df2 - (Df2 - Df3)*0.5 \\ &= (Df2 + Df3)*0.5 \end{aligned} \qquad (7)$$

In this case, a bottom-right kerning distance Dk3 is set to the value Dp1 as the bottom-right kerning data.

Also, in cases where the bottom-left fit data is regarded as the left minimum fit data, a top-left kerning distance Dk4 between the left side line Ls2 and a top-left kerning line Lk4 designated by the top-left kerning data is determined as the top-left kerning data according to an equation (8), and a middle-left kerning distance Dk5 between the left side line Ls2 and a middle-left kerning line Lk5 designated by the middle-left kerning data is determined as the middle-left kerning data according to an equation (9).

$$\begin{aligned} Dk4 &= Df4 - (Df4 - Df6)*0.5 \\ &= (Df4 + Df6)*0.5 \end{aligned} \qquad (8)$$

$$\begin{aligned} Dk5 &= Df5 - (Df5 - Df6)*0.5 \\ &= (Df5 + Df6)*0.5 \end{aligned} \qquad (9)$$

In this case, a bottom-left kerning distance Dk6 is set to the value Dp2 as the bottom-left kerning data.

In cases where the top-right fit data is regarded as the right minimum fit data, a middle-right kerning distance Dk2 between the right side line Ls1 and a middle-right kerning line Lk2 designated by the middle-right kerning data is determined as the middle-right kerning data according to an equation (10), and a bottom-right kerning distance Dk3 between the right side line Ls1 and a bottom-right kerning line Lk3 designated by the bottom-right kerning data is determined as the bottom-right kerning data according to an equation (11).

$$\begin{aligned} Dk2 &= Df2 - (Df2 - Df1)*0.5 \\ &= (Df2 + Df1)*0.5 \end{aligned} \qquad (10)$$

$$\begin{aligned} Dk3 &= Df3 - (Df3 - Df1)*0.5 \\ &= (Df3 + Df3)*0.5 \end{aligned} \qquad (11)$$

In this case, a top-right kerning distance Dk1 is set to the value Dp1 as the top-right kerning data.

Also, in cases where the top-left fit data is regarded as the left minimum fit data, a middle-left kerning distance Dk5 between the left side line Ls2 and a middle-left kerning line Lk5 designated by the middle-left kerning data is determined as the middle-left kerning data according to an equation (12), and a bottom-left kerning distance Dk6 between the left side line Ls2 and a bottom-left kerning line Lk6 designated by the bottom-left kerning data is determined as the bottom-left kerning data according to an equation (13).

$$Dk5 = Df5 - (Df5 - Df4)*0.5 \qquad (12)$$
$$\phantom{Dk5} = (Df5 + Df4)*0.5$$

$$Dk6 = Df6 - (Df6 - Df4)*0.5 \qquad (13)$$
$$\phantom{Dk6} = (Df6 + Df4)*0.5$$

In this case, a top-left kerning distance Dk4 is set to the value Dp2 as the top-left kerning data.

In cases where the middle-right fit data is regarded as the right minimum fit data, a top-right kerning distance Dk1 between the the right side line Ls1 and a top-right kerning line Lk1 designated by the top-right kerning data is determined as the top-right kerning data according to an equation (14), and a bottom-right kerning distance Dk3 between the right side line Ls1 and a bottom-right kerning line Lk3 designated by the bottom-right kerning data is determined as the bottom-right kerning data according to an equation (15).

$$Dk1 = Df1 - (Df1 - Df2)*0.5 \qquad (14)$$
$$\phantom{Dk1} = (Df1 + Df2)*0.5$$

$$Dk3 = Df3 - (Df3 - Df2)*0.5 \qquad (15)$$
$$\phantom{Dk3} = (Df3 + Df2)*0.5$$

In this case, a middle-right kerning distance Dk2 is set to the value Dp1 as the middle-right kerning data.

Also, in cases where the middle-left fit data is regarded as the left minimum fit data, a top-left kerning distance Dk4 between the left side line Ls2 and a top-left kerning line Lk4 designated by the top-left kerning data is determined as the top-left kerning data according to an equation (16), and a bottom-left kerning distance Dk6 between the left side line Ls2 and a bottom-left kerning line Lk6 designated by the bottom-left kerning data is determined as the bottom-left kerning data according to an equation (17).

$$Dk4 = Df4 - (Df4 - Df5)*0.5 \qquad (16)$$
$$\phantom{Dk4} = (Df4 + Df5)*0.5$$

$$Dk6 = Df6 - (Df6 - Df5)*0.5 \qquad (17)$$
$$\phantom{Dk6} = (Df6 + Df5)*0.5$$

In this case, a middle-left kerning distance Dk5 is set to the value Dp2 as the middle-left kerning data.

Figure 13F:
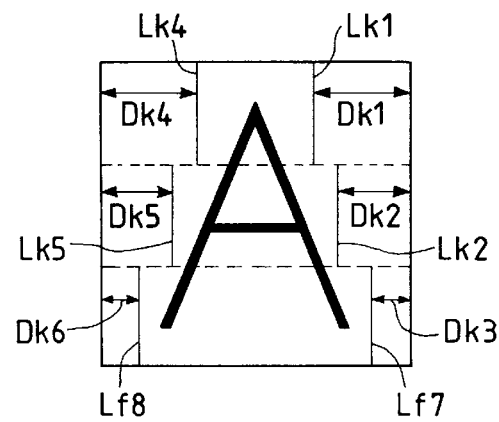

As shown in FIG. 13F, in cases where the letter "A" is specified to determine a minimum character region for the letter "A", a minimum character region R0 required by the letter "A" is determined in the unit 18 by the top-right kerning line Lk1 designated by the top-right kerning data, the middle-right kerning line Lk2 designated by the middle-right kerning data, the right minimum fit line Lf7 designated by the right minimum fit data, the top-left kerning line Lk4 designated by the top-left kerning data, the middle-left kerning line Lk5 designated by the middle-left kerning data and the left minimum fit line Lf8 designated by the left minimum fit data. The minimum character region R0 is composed of a top partitive character region Rct placed on the top partitive region Rt, a middle partitive character region Rcm placed on the middle partitive region Rm and a bottom partitive character region Rcb placed on the bottom partitive region Rb.

Figure 15:
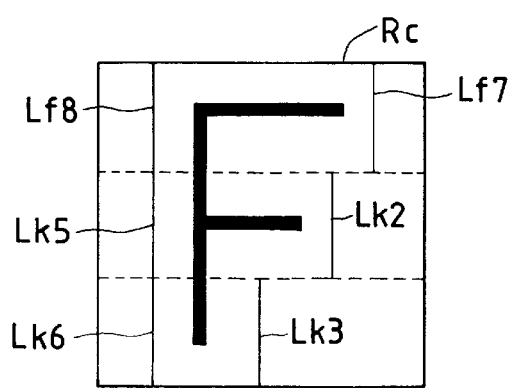
FIG. 15 shows a minimum character region for a letter "F" determined according to the minimum character region determining method.

Also, in cases where a minimum character region R0 required by a letter such as "F" is calculated, the top-right fit data is regarded as the right minimum fit data, and the top-left fit data is regarded as the left minimum fit data. Therefore, as shown in FIG. 15, an enclosed region of the letter "F" is determined by the right minimum fit line Lf7, the middle-right kerning line Lk2 designated by the middleright kerning data, the bottom-right kerning line Lk3 designated by the bottom-right kerning data, the left minimum fit line Lf8, the middle-left kerning line Lk5 designated by the middle-left kerning data and the bottom-left kerning line Lk6 designated by the top-left kerning data as a minimum character region R0 required for the letter "F".

Figure 16:
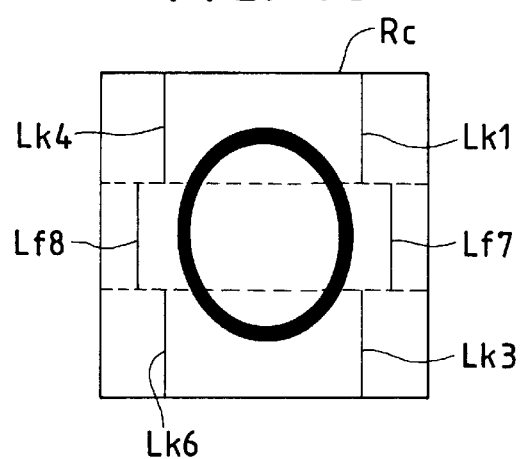
FIG. 16 shows a minimum character region for a letter "0" determined according to the minimum character region determining method.

Also, in cases where a minimum character region R0 required by a letter such as "O" is calculated, the middleright fit data is regarded as the right minimum fit data, and the middle-left fit data is regarded as the left minimum fit data. Therefore, as shown in FIG. 16, an enclosed region of the letter "O" is determined by the top-right kerning line Lk1 designated by the top-right kerning data, the right minimum fit line Lf7, the bottom-right kerning line Lk3 designated by the bottom-right kerning data, the top-left kerning line Lk4 designated by the top-left kerning data, the left minimum fit line Lf8 and the bottom-left kerning line Lk6 designated by the top-left kerning data as a minimum character region R0 required for the letter "O".

Accordingly, because a minimum character region R0 required for a letter is specified by the kerning data regardless of a first adjacent word preceding to the word and a second adjacent word succeeding to the word, a storage capacity required to store the kerning data produced for all of letters can be considerably reduced. Therefore, letters in a character string are put close together by utilizing a standard-grade computer having a small capacity type memory on condition that the minimum character regions for the letters are not overlapped each other.

Also, because sizes of the partitive character regions Rct, Rcm and Rcb of the minimum character region R0 for a letter are respectively determined according to the right and left kerning data produced from the right and left fit data which specify shape features of the letter, it is substantially judged whether a side portion of the letter is parallel to the Y-axis, is inclined to the Y-axis, or is vertical to the Y-axis. Therefore, in cases where letters of a character string are put close together on condition that the minimum character regions R0 for the letters are not overlapped each other, the letters of the character string can be arranged for a reader to feel comfortable because character pitches between the letters are determined by considering shape features of each of the letters.

Figure 17:
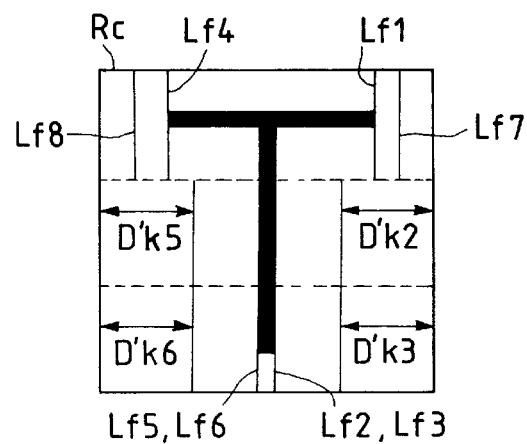
FIG. 17 shows a minimum character region for a letter "T" determined according to another minimum character region determining method applied in cases where a maximum difference among right fit distances Df1,Df2 and Df3 or left fit distances Df4,Df5 and Df6 is higher than a prescribed value.

In the above embodiment, a coefficient of 0.5 is utilized in the equations (6) to (17). However, in cases where a fit data difference between the right minimum fit data and a piece of fit data placed at the most left side among the top-right fit data, the middle-right fit data and the bottom-right fit data is more than a prescribed value, it is preferred that the coefficient utilized for the right kerning distances Dk1,Dk2 and Dk3 be set to 0.6 to enlarge the minimum character region R0 for a letter determined in the minimum character region determining apparatus 11. In the same manner, in cases where a fit data difference between the left minimum fit data and a piece of fit data placed at the most right side among the top-left fit data, the middle-left fit data and the bottom-left fit data is more than a prescribed value, it is preferred that the coefficient utilized for the left kerning distances Dk4,Dk5 and Dk6 be set to 0.6 to enlarge the minimum character region R0 for a letter determined in the minimum character region determining apparatus 11. For example, as shown in FIG. 17, a minimum character region R0 for a letter "T" in a character string "TwA" is determined in the apparatus 11, a middle-right kerning distance D'k2 and a bottom-right kerning distance D'k3 are determined according to equations (18), (19) because the top-right fit distance Df1 has a minimum value among the fit distances Df1, Df2 and Df3.

$$D'k2=Df2-(Df2-Df1)*0.6 \qquad (18)$$

$$D'k3=Df3-(Df3-Df1)*0.6 \qquad (19)$$

Therefore, because the distances D'k2, D'k3 are shorter than the distances Dk2, Dk3, a character pitch between the letter "T" and the letter "w" can be put close together so as to prevent that the letter "w" excessively approaches the letter "T".

Accordingly, the character string "TwA" looks to arrange the letters "T","w" and "A" more uniformly.

Also, in cases where it is desired to print or display a character string in which letters are put close together more uniformly and readably, it is preferred that a minimum character region R0 for each of letters in the character string be shrunk. For example, in cases where the bottom-right fit data is regarded as the right minimum fit data, a top-right kerning distance D"k1 and a middle-right kerning distance D"k2 are determined according to equations (20), (21).

$$D"k1=Df1-(Df1-Df3)*0.5-(Df3-Dp1) \qquad (20)$$

$$D"k2=Df2-(Df2-Df3)*0.5-(Df3-Dp1) \qquad (21)$$

In this case, a bottom-right kerning distance D"k3 is set to the value Dk1. Also, in cases where the bottom-left fit data is regarded as the left minimum fit data, a top-left kerning distance D"k4 and a middle-left kerning distance D"k5 are determined according to equations (22), (23).

$$D"k4=Df4-(Df4-Df6)*0.5-(Df6-Dp2) \qquad (22)$$

$$D"k5=Df5-(Df5-Df6)*0.5-(Df6-Dp2) \qquad (23)$$

In this case, a bottom-left kerning distance D"k6 is set to the value Dk6. Also, in cases where the top-right fit data is regarded as the right minimum fit data, a middle-right kerning distance D"k2 and a bottom-right kerning distance D"k3 are determined according to equations (24), (25).

$$D"k2=Df2-(Df2-Df1)*0.5-(Df1-Dp1) \qquad (24)$$

$$D"k3=Df3-(Df3-Df1)*0.5-(Df1-Dp1) \qquad (25)$$

In this case, a top-right kerning distance D"k1 is set to the value Dk1. Also, in cases where the top-left fit data is regarded as the left minimum fit data, a middle-left kerning distance D"k5 and a bottom-left kerning distance D"k6 are determined according to equations (26), (27).

$$D"k5=Df5-(Df5-Df4)*0.5-(Df4-Dp2) \qquad (26)$$

$$D"k6=Df6-(Df6-Df4)*0.5-(Df4-Dp2) \qquad (27)$$

In this case, a top-left kerning distance D"k4 is set to the value Dk4. Also, in cases where the middle-right fit data is regarded as the right minimum fit data, a top-right kerning distance D"k1 and a bottom-right kerning distance D"k3 are determined according to equations (28), (29).

$$D"k1=Df1-(Df1-Df2)*0.5-(Df2-Dp1) \qquad (28)$$

$$D"k3=Df3-(Df3-Df2)*0.5-(Df2-Dp1) \qquad (29)$$

In this case, a middle-right kerning distance D"k2 is set to the value Dk2. Also, in cases where the middle-left fit data is regarded as the left minimum fit data, a top-left kerning distance D"k4 and a bottom-left kerning distance D"k6 are determined according to equations (30), (31).

$$D"k4=Df4-(Df4-Df5)*0.5-(Df5-Dp2) \qquad (30)$$

$$D"k6=Df6-(Df6-Df5)*0.5-(Df5-Dp2) \qquad (31)$$

In this case, a middle-left kerning distance D"k5 is set to the value Dk5.

Accordingly, because values of third terms in the equations (20) to (31) determined according to a shape of each of letters in a character string, in cases where a plurality of minimum character regions for letters specified by the kerning distances D"k1 to D"6 are connected in series to each other on condition that the minimum character regions are not overlapped each other, letters of a character string can be more uniformly put close together, and a reader feels more readably to read the character string.

Also, the minimum character region determining apparatus 11 shown in FIG. 11 is utilized in the above embodiment.

However, as shown in FIG. 18, it is applicable that a minimum character region determining apparatus 21 comprise an outline data and proportional data storing unit 22, the partitioning unit 14, the calculating unit 15, the determining unit 16, the calculating unit 17 and the minimum character region determining unit 18. That is, pieces of outline data for each of letters such as alphanumeric characters and Japanese letters, a piece of right proportional data for each of the letters and a piece of left proportional data for each of the letters are stored in the outline data and proportional data storing unit 22. Therefore, a set of pieces of outline data, a piece of right proportional data and a piece of left proportional data is read out to the partitioning unit 14, the calculating unit 15, the determining unit 16 and the calculating unit 17 for each of the letters.

Accordingly, because a piece of right proportional data or each of the letters and a piece of left proportional data for each of the letters are stored in advance in the storing unit 22, the producing unit 13 is not required, so that the configuration of the minimum character region determining apparatus 21 can be simplified.

Also, because the calculation of the right and left proportional data for each of the letters can be omitted, a minimum character region R0 for each of the letter can be quickly determined in the minimum character region determining apparatus 21.

In addition, a storage capacity required to store the right and left proportional data for the letters is not so much. Therefore, not only minimum character regions of the alphanumeric letters but also minimum character regions of Japanese letters, Japanese secondary letters called "katakana" in Japan and Chinese characters used in Japanese writing can be determined according to the minimum character region determining method in the minimum character determining apparatus 11.

Next, a character string generating apparatus according to an embodiment of the present invention is described.

FIG. 19 is a block diagram of a character string generating apparatus, which is connected to the minimum character region determining apparatus 11 shown in FIG. 11, according to an embodiment of the present invention.

As shown in FIG. 19, a character string generating apparatus 31 comprises a character arranging unit 32 for arranging letters of a character string according to the the minimum character regions for the letters obtained in the minimum character region determining unit 18 of the minimum character region determining apparatus 11 to put the letters close together, and a character string outputting unit 33 for displaying or printing the character string, of which the letters are put close together in the arranging unit 32, on a display or on a printing paper.

Figure 20:
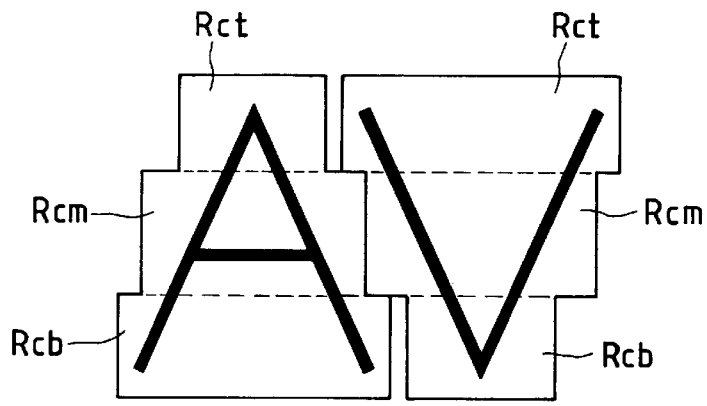
FIG. 20 shows a character string "AV" having letters "A" and "V" of which minimum character regions are determined according to the minimum character region determining method shown in FIGS. 12 and 13, the letters "A" and "V" being put close together in the character string generating apparatus shown in FIG. 19.

In the above configuration, a fore letter and a rear letter adjacent to each other in a character string approach together in the arranging unit 32 to connect at least one of partitive character regions Rct, Rcm and Rcb of a minimum character region R0 for the fore letter to a corresponding partitive character region Rct, Rcm or Rcb of another minimum character region R0 for the rear letter on condition that the minimum character regions are not overlapped. For example, as shown in FIG. 20, in cases where a fore letter "A" and a rear letter "V" are expected to be put close together in the arranging unit 32, a middle partitive character region Rcm of a minimum character region R0 for the fore letter "A" is connected to a middle partitive character region Rcm of a minimum character region R0 for the rear letter "V". In this case, top partitive character regions Rct facing each other are not connected, and bottom partitive character regions Rcb facing each other are not connected.

In this embodiment, a pair of minimum character regions for fore and rear letters is connected together as follows to put the fore and rear letters close together.

Figure 21:
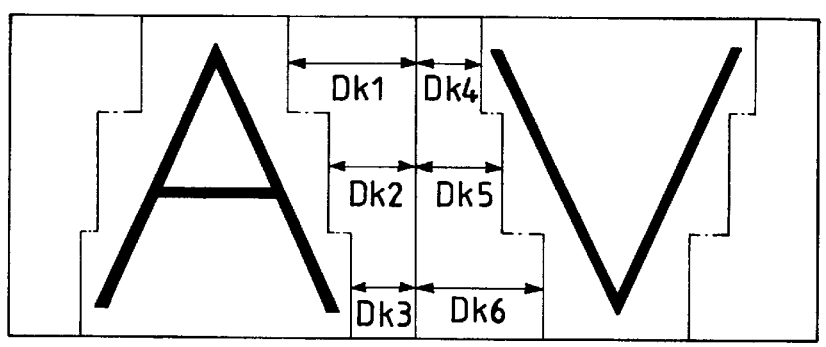
FIG. 21 shows a method for arranging the letters "A" and "V" in a character arranging unit of the character string generating apparatus shown in FIG. 19.

As shown in FIG. 21, squared character regions of fore and rear letters are arranged to be adjacent to each other. Thereafter, a top-right kerning distance Dk1 for the fore letter and a top-left kerning distance Dk4 for the rear letter are added to obtain a top summed value, a middle-right kerning distance Dk2 for the fore letter and a middle-left kerning distance Dk5 for the rear letter are added to obtain a middle summed value, and a bottom-right kerning distance Dk3 for the fore letter and a bottom-left kerning distance Dk6 for the rear letter are added to obtain a bottom summed value. Thereafter, a minimum value among the top summed value, the middle summed value and the bottom summed value is selected. Thereafter, the minimum value is subtracted from the top summed value to obtain a top subtracted value, the minimum value is subtracted from the middle summed value to obtain a middle subtracted value, and the minimum value is subtracted from the bottom summed value to obtain a bottom subtracted value. Thereafter, top partitive character regions Rct of minimum character regions R0 for the fore and rear letters are arranged to set a top distance between the top partitive character regions Rct to the top subtracted value, middle partitive character regions Rcm of the minimum character regions R0 are arranged to set a middle distance between the middle partitive character regions Rcm to the middle subtracted value, and bottom partitive character regions Rcb of the minimum character regions R0 are arranged to set a bottom distance between the bottom partitive character regions Rcb to the bottom subtracted value. Therefore, as shown in FIG. 20, the fore and rear letters can be put close together for a reader to feel comfortable.

Accordingly, because sizes of the partitive character regions Rct, Rcm and Rcb of the minimum character region R0 for each of letters in a character string are respectively determined in the minimum character region determining apparatus 11, it is substantially judged whether a side portion of a letter is parallel to the Y-axis, is inclined to the Y-axis, or is vertical to the Y-axis. Therefore, letters in a character string can be put close together while substantially considering shapes of the letters. In other words, letters in a character string can be put close together according to shapes of the letters. As a result, a reader can feels that letters of a character string are spaced at equal distances, so that the reader can feel comfortable.

Figure 22A:
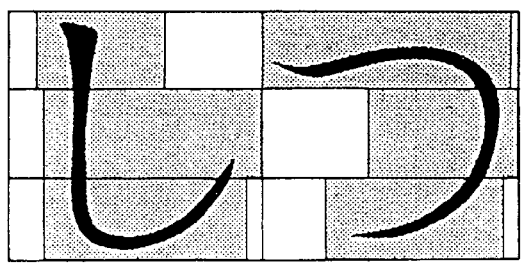
FIG. 22A shows Japanese letters " し " and " つ " of which squared character regions are connected to each other.
Figure 22B:
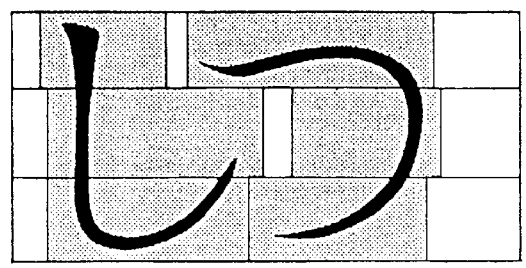
FIG. 22B shows a Japanese letter string arranged in the character string generating apparatus shown in FIG. 19.

Also, in cases where the character string generating apparatus 31 is utilized to put Japanese letters of a Japanese letter string "しつ" close together, the Japanese letter string in which squared character regions of the Japanese letters are connected each other as shown in FIG. 22A is displayed or printed as shown in FIG. 22B. Therefore, the Japanese letters are not excessively put close together.

Accordingly, the minimum character region determining apparatus 11 and the character string generating apparatus 31 can be useful for the Japanese letter string.

Figure 23:
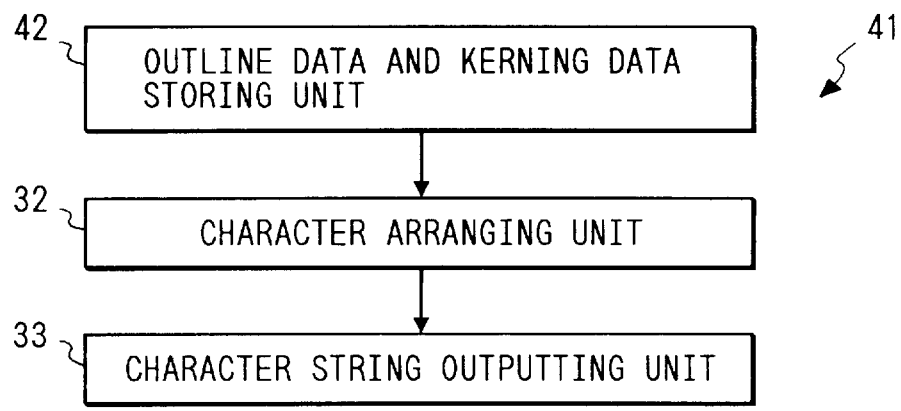
FIG. 23 is a block diagram of a character string generating apparatus according to another embodiment of the present invention.

In the above embodiment of the character string generating apparatus, the character string generating apparatus 31 is connected to the minimum character region generating apparatus 11. However, as shown in FIG. 23, it is applicable that a character string generating apparatus 41 comprise an outline data and kerning data storing unit 42, the character arranging unit 32 and the character string outputting unit 33. That is, pieces of outline data, a piece of top-right kerning data, a piece of middle-right kerning data, a piece of bottom-right kerning data, a piece of top-left kerning data, a piece of middle-left kerning data and a piece of bottom-left kerning data for each of letters such as alphanumeric characters and Japanese letters are stored in the outline data and kerning data storing unit 42. The kerning data for the letters are calculated in advance in the minimum character region determining apparatus 11.

Accordingly, a character string can be put close together at a high speed because it is not required to calculated the kerning data for each of letters.

Figure 24:
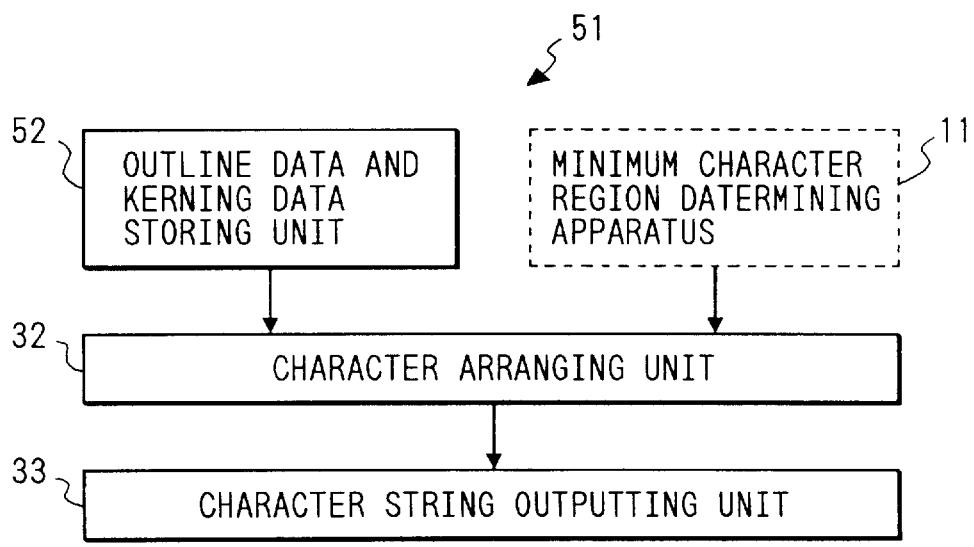
FIG. 24 is a block diagram of a character string generating apparatus according to another embodiment of the present invention.

Also, as shown in FIG. 24, it is applicable that a character string generating apparatus 51 comprise an outline data and kerning data storing unit 52 for storing pieces of outline data, a piece of top-right kerning data, a piece of middle-right kerning data, a piece of bottom-right kerning data, a piece of top-left kerning data, a piece of middle-left kerning data and a piece of bottom-left kerning data for each of alphanumeric characters, the character arranging unit 32 for arranging alphanumeric characters of an alphanumeric character string according to the kerning data stored in the storing unit 52 to put the alphanumeric characters close together and arranging other type letters of a character string according to the minimum character regions obtained in the the minimum character region determining apparatus 11 to put the letters close together, and the character string outputting unit 33.

Also, the squared character region Rc for a letter is partitioned into the partitive regions Rt, Rm and Rb in the above embodiment. The number of partitive regions is determined by considering the increase of a data capacity required for storing the fit data and the character data for each of the partitive regions and the increase of a processing time on condition that letters of a character string is comfortably put close together. However, it is applicable that the squared character region Rc for a letter be partitioned into two partitive regions or be partitioned into four or more partitive regions if circumstances require.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A minimum character region determining method, comprising the steps of:

preparing a letter of a character string, the letter being placed in a rectangular character region;

producing a right proportional data value indicating a right proportional position spaced apart from the letter toward a right direction and a left proportional data value indicating a left proportional position spaced apart from the letter toward a left direction;

horizontally partitioning the rectangular character region of the letter into a plurality of partitive regions by one or more boundary lines to horizontally partition the letter into a plurality of portions of the letter;

detecting one or more starting points of one or more line segments of the letter and one more ending points of the line segments for each of the partitive regions;

detecting one or more intersection points between the letter and each boundary line for each of the partitive regions;

determining one point placed on most right side among the starting and ending points of the line segments and the intersection points as a right fit point for each of the partitive regions;

determining one point end placed on the most left side among the starting and ending points of the line segments and the intersection points as the left fit point for each of the partitive regions;

producing a right fit data value indicating a right fit position of the right fit point for each of the partitive regions;

producing a left fit data value indicating a left fit position of the left fit point for each of the partitive regions;

determining a right minimum fit data value denoting one right fit position placed on the most right side among the right fit positions, one partitive region relating to the right minimum fit data value being called a right minimum partitive region;

determining a left minimum fit data value denoting one left fit position placed on the most left side among the left fit positions, one partitive region relating to the left minimum fit data value being called a left minimum partitive region;

setting the right proportional data value to a right kerning data value defined in the right minimum partitive region;

setting the left proportional data value to a left kerning data value defined in the left minimum partitive region;

setting a prescribed right value between the right minimum fit data value and one right fit data value for each of the partitive regions other than the right minimum partitive region to another right kerning data value;

setting a prescribed left value between the left minimum fit data value and one left fit data value defined for each of the partitive regions other than the left minimum partitive region to another kerning data value;

determining a minimum character region for the letter of which a right side is limited by a plurality of right kerning positions indicated by the right kerning data values for all of the partitive regions and a left side is limited by the left kerning positions denoted by the left kerning data in all of the partitive regions; and outputting or displaying the minimum character region on a printer or a display.

2. A method according to claim 1, in which the step of setting a prescribed right value includes:

setting the prescribed right value to a value of a midpoint between the right minimum fit data value and one right fit data value defined for each of the partitive regions other than the right minimum partitive region; and the step of setting a prescribed left value includes:

setting the prescribed left value to a value of a midpoint between the left minimum fit data value and one left fit data value defined for each of the partitive regions other than the left minimum partitive region.

3. A method according to claim 1, in which the step of preparing a letter of a character string includes:

specifying a letter of a character string which is composed of a string of alphanumeric letters or Japanese letters.

4. A method according to claim 1, in which the step of horizontally partitioning the rectangular character region of the letter includes:

partitioning the rectangular character region of the letter into three partitive regions.

5. A minimum character region determining apparatus, comprising:

outline data storing means for storing outline data of a letter, the letter being placed in a rectangular character region;

proportional data producing means for producing right proportional data indicating a right proportional position spaced apart from the letter toward a right direction and left proportional data indicating a left proportional position spaced apart from the letter toward a left direction according to the outline data of the letter stored in the outline data storing means;

character region partitioning means for horizontally partitioning the rectangular character region of the letter into a plurality of partitive regions by one or more boundary lines to horizontally partition the letter into a plurality of portions of the letter;

fit data producing means for detecting one or more starting points of one or more line segments of the letter, one or more ending points of the line segments and one or more intersection points between the letter and each boundary line for each of the partitive regions according to the outline data of the letter stored in the outline data storing means, determining one point placed on the most right side among the starting and ending points of the line segments and the intersection points as a right fit point for each of the partitive regions; determining one point placed on the most left side among the starting and ending points of the line segments and the intersection points as a left fit point for each of the partitive regions, producing right fit data indicating a right fit position of the right fit point for each of the partitive regions, and producing left fit data indicating a left fit position of the left fit point for each of the partitive regions;

right minimum fit data determining means for determining right minimum fit data denoting one right fit position placed on the most right side among the right fit positions of the right fit data produced by the fit data producing means, one partitive region relating to the right minimum fit data being called a right minimum partitive region;

left minimum fit data determining means for determining left minimum fit data denoting one left fit position placed on the most left side among the left fit positions of the left fit data produced by the fit data producing means, one partitive region relating to the left minimum fit data being called a left minimum partitive region;

first right kerning data setting means for setting the right proportional data produced by the proportional data producing means to right kerning data defined in the right minimum partitive region;

first left kerning data setting means for setting the left proportional data produced by the proportional data producing means to left kerning data defined in the left minimum partitive region;

second right kerning data setting means for setting a prescribed right value between a value of the right minimum fit data determined by the right minimum fit data determining means and a value of one right fit data defined for each of the partitive regions other than the right minimum partitive region by the fit data producing means to a value of another right kerning data;

second left kerning data setting means for setting a prescribed left value between a value of the left minimum fit data value determined by the left minimum fit data determining means and a value of one left fit data value defined for each of the partitive regions other than the left minimum partitive region by the fit data producing means to another left kerning data;

minimum character region determining means for determining a minimum character region for the letter of which a right side is limited by a plurality of right kerning positions indicated by the right kerning data produced by the first right kerning data setting means and the second right kerning data setting means and a left side is limited by a plurality of left kerning positions indicated by the left kerning data produced by the first left kerning data setting means and the second left kerning data setting means; and displaying means for displaying the minimum character region.

6. An apparatus according to claim 5, in which the prescribed right value is set to a value of a midpoint between the right minimum fit data value and one right fit data value defined for each of the partitive regions other than the right minimum partitive region in the second right kerning data setting means, and the prescribed left value is set to a value of a midpoint between the left minimum fit data value and one left fit data value defined for each of the partitive regions other than the left minimum partitive region in the second left kerning data setting means.

7. An apparatus according to claim 5, in which a letter indicated by the outline data in the outline data storing means is an alphanumeric letter or a Japanese letter.

8. An apparatus according to claim 5, in which the number of partitive regions produced in the squared character region partitioning means is three.

9. A character string generating apparatus, comprising:

outline data storing means for storing outline data of each of letters in a character string, the letter being placed in a rectangular character region;

proportional data producing means for producing right proportional data indicating a right proportional position spaced apart from a letter toward a right direction and left proportional data indicating a left proportional position spaced apart from the letter toward a left direction according to the outline data of the letter stored in the outline data producing means:

character region partitioning means for horizontally partitioning the rectangular character region of the letter into a plurality of partitive regions by one or more boundary lines to horizontally partition the outline data the letter stored in the outline data producing means into a plurality of portions of the letter;

fit data producing means for detecting one or more starting points of one or more line segments of the letter, one or more ending points of the line segments and one or more intersection points between the letter and each boundary line for each of the partitive regions according to the outline data of the letter stored in the outline data storing means, determining one point placed on the most right side among the starting and ending points of the line segments and the intersection points as a right fit point for each of the partitive regions; determining one point placed on the most left side among the starting and ending points of the line segments and the intersection points as a left fit point for each of the partitive regions, producing right fit data indicating a right fit position of the right fit point for each of the partitive regions, and producing left fit data indicating a left fit position of the left fit point for each of the partitive regions;

right minimum fit data determining means for determining right minimum fit data denoting one right fit position placed on the most right side among the right fit positions, one partitive region relating to the right minimum fit data being called a right minimum partitive region;

left minimum fit data determining means for determining left minimum fit data denoting one left fit position placed on the most left side among the left fit positions, one partitive region relating to the left minimum fit data being called a left minimum partitive region;

first right kerning data setting means for setting the right proportional data produced by the proportional data producing means to right kerning data defined in the right minimum partitive region;

first left kerning data setting means for setting the left proportional data produced by the proportional data producing means to left kerning data defined in the left minimum partitive region;

second right kerning data setting means for a setting a mid-point between a value of the right minimum fit data determined by the right minimum fit data determining means and a value of one right fit data defined for each of the partitive regions other than the right minimum partitive region by the fit data producing means to a value of another right kerning data;

second left kerning data setting means for setting a mid-point between a value of the left minimum fit data value determined by the left minimum fit data determining means and a value of one left fit data value defined for each of the partitive regions other than the left minimum partitive region by the fit data producing means to another left kerning data;

minimum character region determining means for determining a minimum character region for the letter of which a right side is limited by a plurality of right kerning positions indicated by the right kerning data produced by the first right kerning data setting means and the second right kerning data setting means and a left side is limited by a plurality of left kerning positions indicated by the left kerning data produced by the first left kerning data setting means and the second left kerning data setting means;

character arranging means for arranging the letters of the character string, of which the outline data are stored in the outline data storing means, in a line to put the letters close together on condition that the minimum character regions determined for the letters in the minimum character region determining means are not overlapped each other; and character string outputting means for outputting the character string of which the letters are arranged by the character arranging means.

10. A minimum character region determining method, comprising the steps of:

preparing a letter of a character string, the letter being placed in a rectangular character region;

producing a right proportional data value indicating a right proportional position spaced apart from the letter toward a right direction and a left proportional data value indicating a left proportional position spaced apart from the letter toward a left direction;

horizontally partitioning the rectangular character region of the letter into a plurality of partitive regions to horizontally partition the letter into a plurality of portions of the letter;

producing a right fit data value indicating a right fit position, at which a portion of the letter placed at the most right side in one partitive region is positioned, for each of the partitive regions;

producing a left fit data value indicating a left fit position, at which a portion of the letter placed at the most left side in one partitive region is positioned, for each of the partitive regions;

determining a right minimum fit data value denoting one right fit position placed on the most right side among the right fit positions, one partitive region relating to the right minimum fit data value being called a right minimum partitive region;

determining a left minimum fit data value denoting one left fit position placed on the most left side among the left fit positions, one partitive region relating to the left minimum fit data value being called a left minimum partitive region;

setting the right proportional data value to a right kerning data value defined in the right minimum partitive region;

setting the left proportional data value to a left kerning data value defined in the left minimum partitive region;

setting right kerning data value for each of the partitive regions other than the right minimum partitive region to a value (0.6*P1+0.4*P2) determined by a ratio 0.6/0.4 of the right minimum fit data value (P1) to one right fit data value (P2) defined for one partitive region other than the right minimum partitive region;

setting left kerning data value for each of the partitive regions other than the left minimum partitive region to a value (0.6*P3+0.4*P4) determined by a ratio 0.6/0.4 of the left minimum fit data value (P3) to one left fit data value (P4) defined for one partitive region other than the left minimum partitive region;

determining a minimum character region for the letter of which a right side is limited by a plurality of right kerning positions indicated by the right kerning data values for all of the partitive regions; and outputting or displaying the minimum character region on a printer or a display.

11. A minimum character region determinting method, comprising the steps of:

preparing a letter of a character string, the letter being placed in a rectangular character region;

producing a right proportional data value indicating a right proportional position spaced apart from the lettertoward a right directionand a left proportional data value indicating a left proportional position spaced apart from the letter toward a left direction;

horizontally partitioning the rectangular character region of the letter into a plurality of partitive regions to horizontally partition the letter into a plurality of portions to the letter;

producing a right fit data value indicating a right fit position, at which a portion placed at the most right side in one partitive region is positioned, for each of the partitive regions;

producing a left fit data value indicating a left fit position, at which a portion of the letter placed at the most left side in one partitive region is positioned, for each of the partitive regions;

determining a right minimum fit data value denoting one right fit position placed on the most right side among the fit position, one partitive region relating to the right minimum fit data value being called a right minimum patitive region;

determining a left minimum fit data value denoting one left fit position placed on the most left side among the left fit positions, one partitive region relating to the left minimum fit data value being calleda left minimum partitive region;

setting the right proportional data value to a right kerning data value defined in the right minimum partitive region;

setting the left proportional data value to a left kerning data value defined in the left minimum partitive region;

expressing the right fit data value for each partitive region by a right fit distance Drf between the right fit position indicated by the right fit data value and a right side line of the and the left side line of the rectangular character region;

expressing left kernal data value for each of the partitive regions other than the left minimum partitive region by a left kerning distance Dlk between a left kerning position indicated by a left kerning data value and the left side af the rectangular character region;

setting the left kerning distance Dlk to Dlk=Dlf−(Dlf−Dlm) *0.5−(Dlm-Dlp);

determing a minimum charater region fot the letter of which a right side is limited by a pluality of right kerning positions indicated by the right kerning data values for all the partitive regions; and outputting or displaying the minimum carachter region on a printer or a display.

12. A minimum character region determining apparatus, comprising:

outline data storing means for storing outline data of a letter, the letter being placed in a rectangular character region;

proportional data producing means for producing right proportional data indicating a right proportional position spaced apart from the letter toward a right direction and left proportional data indicating a left proportional position spaced apart from the letter toward a left direction according to the outline data of the letter stored in the outline data storing means;

character region partitioning means for horizontally partitioning the rectangular character region of the letter into a plurality of partitive regions to horizontally partition the letter into a plurality of portions of the letter;

right fit data producing means for producing right fit data indicating a right fit position, at which a portion of the letter placed at the most right side in one partitive region is positioned, for each of the partitive regions produced by the character region partitioning means according to the outline data stored in the outline data storing means;

left fit data producing means for producing left fit data indicating a left fit position, at which a portion of the letter placed at the most left side in one partitive region is positioned, for each of the partitive regions produced by the character region partitioning means according to the outline data stored in the outline data storing means;

right minimum fit data determining means for determining right minimum fit data denoting one right fit position placed on the most right side among the right fit positions of the right fit data produced by the right fit data producing means, one partitive region relating to the right minimum fit data being called a right minimum partitive region;

left minimum fit data determining means for determining left minimum fit data denoting one left fit position placed on the most left side among the left fit positions of the left fit data produced by the left fit data producing means, one partitive region relating to the left minimum fit data being called a left minimum partitive region;

first right kerning data setting means for setting the right proportional data produced by the proportional data producing means to right kerning data for the right minimum partitive region;

first left kerning data setting means for setting the left proportional data produced by the proportional data producing means to left kerning data for the left minimum partitive region;

second right kerning data setting means for setting right kerning data for each of the partitive regions other than the right minimum partitive region to a value (0.6*P1+0.4*P2) determined by a ratio 0.6/0.4 of a value (P1) of the right minimum fit data determined by the right minimum fit data determining means to a value (P2) of one right fit data produced by the right fit data producing means for one partitive region other than the right minimum partitive region;

second left kerning data setting means for setting left kerning data value for each of the partitive regions other than the left minimum partitive region to a value (0.6*P3+0.4*P4) determined by a ratio 0.6/0.4 of a value (P3) of the left minimum fit data determined by the left minimum fit data determining means to a value (P4) of one left fit data produced by the left fit data producing means for one partitive region other than the left rectangular character region expressing the right minimum fit data value by a minimum right kerning distance Drm between one right fit position placed on the most right side and the right side line of the rectangular character region;

expressing the right proportional data value by a right proportional distance Drp between the right proportional position and the right side line of the rectangular character region;

expressing right kerning data value for each of the partitive regions other than the right minimum partitive region by a right kerning distance Drk between a right kerning position indicated by the right kerning data value and the right side line of the rectangular character region;

setting the right kerning distance Drk to Drk=Drf−(Drf−Drm)*0.5−(Drm−Drp);

expressing the left fit data value for each partitive region by a left fit distance Dlf between the left fit position indicated by the left fit data value and a left side line of the rectangular character region;

expressing the left minimum fit data value by a minimum left kerning distance Dlm between one left fit position placed on the most left side and the left side line of the rectangular character region;

expressing the left proportional data value by a left proportional distance Dlp between the left proportional position minimum partitive region;

minimum character region determining means for determining a minimum character region for the letter of which a right side is limited by a plurality of right kerning positions indicated by the right kerning data produced by the first right kerning data setting means and the second right kerning data setting means and a left side is limited by a plurality of left kerning positions indicated by the left kerning data produced by the first left kerning data setting means and the second left kerning data setting means; and displaying means for displaying the minimum character region.

13. A minimum character region determining apparatus, comprising:

outline data storing means for storing outline data of a letter, the letter being placed in a rectangular character region;

proportional data producing means for producing right proportional data indicating a right proportional position spaced apart from the letter toward a right direction and left proportional data indicating a left proportional position spaced apart from the letter toward a left direction according to the outline data of the letter stored in the outline data storing means;

character region partitioning means for horizontally partitioning the rectangular character region of the letter into a plurality of partitive regions to horizontally partition the letter into a plurality of portions of the letter;

right fit data producing means for producing right fit data indicating a right fit position, at which a portion of the letter placed at the most right side in one partitive region is positioned, for each of the partitive regions produced by the character region partitioning means according to the outline data stored in the outline data storing means;

left fit data producing means for producing left fit data indicating a left fit position, at which a portion of the letter placed at the most left side in one partitive region is positioned, for each of the partitive regions produced by the character region partitioning means according to the outline data stored in the outline data storing means;

right minimum fit data determining means for determining right minimum fit data denoting one right fit position placed on the most right side among the right fit positions of the right fit data produced by the right fit data producing means, one partitive region relating to the right minimum fit data being called a right minimum partitive region;

left minimum fit data determining means for determining left minimum fit data denoting one left fit position placed on the most left side among the left fit positions of the left fit data produced by the left fit data producing means, one partitive region relating to the left minimum fit data being called a left minimum partitive region;

first right kerning data setting means for setting the right proportional data produced by the proportional data producing means to right kerning data for the right minimum partitive region;

first left kerning data setting means for setting the left proportional data produced by the proportional data producing means to left kerning data for the left minimum partitive region;

second right kerning data setting means for setting right kerning data for each of the partitive regions other than the right minimum partitive region on condition that a right kerning distance Drk between a right kerning position indicated by the right kerning data and a right side line of the rectangular character region is set to $Drk=Drf-(Drf-Drm)*0.5-(Drm-Drp)$, the symbol Drf denoting a right fit distance between the right fit position indicated by the right fit data and the right side line of the rectangular character region, the symbol Drm denoting a minimum right kerning distance between one right fit position placed on the most right side and the right side line of the rectangular character region, and the symbol Drp denoting a right proportional distance between the right proportional position indicated by the proportional data producing means and the right side line of the rectangular character region;

second left kerning data setting means for setting left kerning data for each of the partitive regions other than the left minimum partitive region on condition that a left kerning distance Dlk between a left kerning position indicated by the left kerning data and a left side line of the rectangular character region is set to $Dlk=Dlf-(Dlf-Dlm)*0.5-(Dlm-Dlp)$, the symbol Dlf denoting a left fit distance between the left fit position indicated by the left fit data and the left side line of the rectangular character region, the symbol Dlm denoting a minimum left kerning distance between one left fit position placed on the most left side and the left side line of the rectangular character region, and the symbol Dlp denoting a left proportional distance between the left proportional position indicated by the proportional data producing means and the left side line of the rectangular character region;

minimum character region determining means for determining a minimum character region for the letter of which a right side is limited by a plurality of right kerning positions indicated by the right kerning data produced by the first right kerning data setting means and the second right kerning data setting means and a left side is limited by a plurality of left kerning positions indicated by the left kerning data produced by the first left kerning data setting means and the second left kerning data setting means; and displaying means for displaying the minimum character region.

* * * * *